May 12, 1964 — J. W. PYURO ETAL — 3,132,891
VEHICLE UNDERBODY CONSTRUCTION
Filed Feb. 5, 1962 — 2 Sheets-Sheet 1

INVENTORS.
John W. Pyuro,
Dick H. Williams &
John E. Rossbach
BY Herbert Furman
ATTORNEY

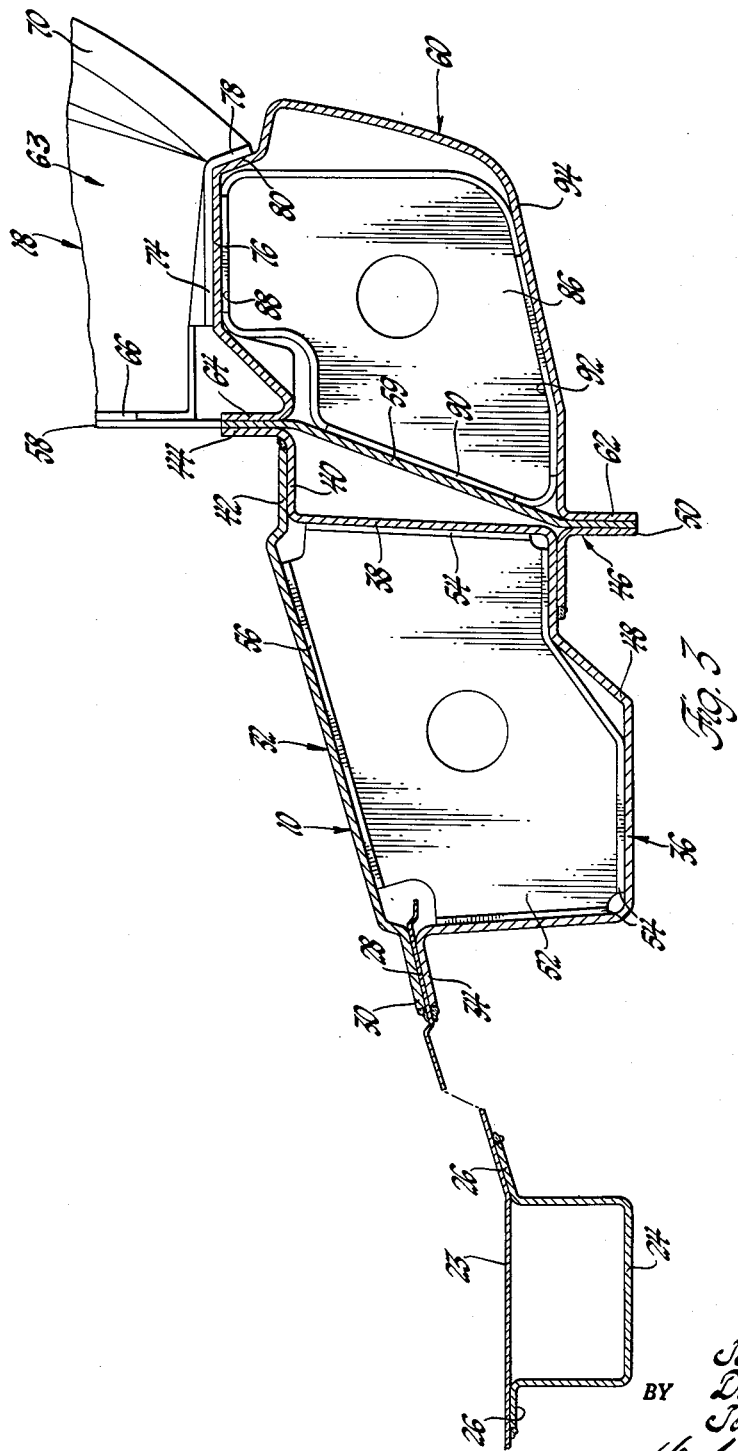

United States Patent Office 3,132,891
Patented May 12, 1964

3,132,891
VEHICLE UNDERBODY CONSTRUCTION
John W. Pyuro, Warren, John E. Rossbach, Royal Oak, and Dick H. Williams, Oak Park, Mich., assignors to General Motors Corporation, Detroit, Mich., a corporation of Delaware
Filed Feb. 5, 1962, Ser. No. 170,964
2 Claims. (Cl. 296—28)

This invention relates to vehicle bodies and more particularly to an improved rocker panel and pillar arrangement for integral vehicle bodies.

Since integral bodies have no separate frame, the body rocker panels must be increased in strength to increase body rigidity against torsional and transverse bending moments. In an integral body, the rocker panel structure generally includes a rocker inner panel secured to a flanged edge of the floor pan and a rocker outer panel member secured to the inner panel member. The pillar structure usually sits or bears against the rocker outer panel and is secured thereto. In certain types of vehicle bodies, such as the four-door hardtop sedan, various bracing arrangements are provided for the pillars, particularly the center pillars which provide the lock pillar for the front door and the hinge pillar for the rear door.

The rocker panel and pillar arrangement of this invention provides an extremely rigid beam structure for an underbody and also provides an economical and simple manner of securing the center pillars to the beam structure whereby the pillars are extremely rigid and add to the strength of the beam structure. Generally, a longitudinally extending box section type member is secured to the floor pan edge portion and provides a pair of oppositely extending lateral flanges at its outer portion. The lower portion of the pillar inner member overlies the outer portion of the box section member and is secured to the lateral flanges thereof so that the pillar inner member functions as a rocker inner panel member. The rocker outer panel member includes flanges welded to the pillar inner member opposite the flanges of the box section member. Bulkheads strengthen the rocker outer panel member and are located to each side of the pillar outer members generally opposite flanged edges thereof bearing and secured to the upper wall of the panel outer member. Thus, an extremely rigid rocker panel and pillar arrangement is provided.

The primary object of this invention is to provide an improved rocker panel and center pillar arrangement for integral vehicle bodies.

This and other objects of the invention will be readily apparent from the following specification and drawings wherein.

Figure 1:
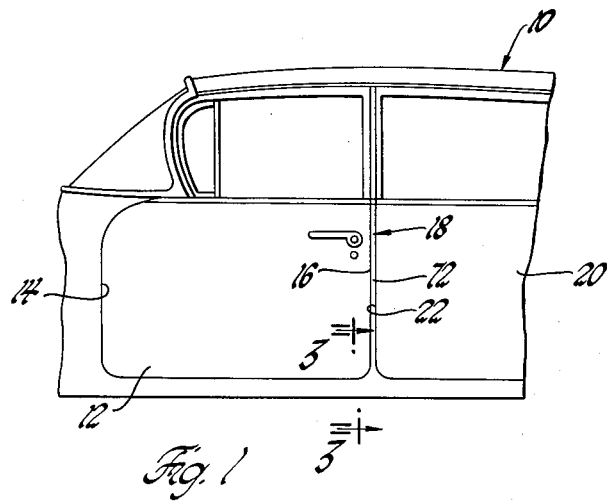
FIGURE 1 is a partial side elevational view of a vehicle body embodying a rocker panel and pillar arrangement according to this invention.

Referring now particularly to FIGURE 1 of the drawings, an integral vehicle body 10 includes a front door 12 hinged at its forward edge 14 to a suitable front pillar structure and latched at its rearward edge 16 to a center pillar 18. The rear door 20 is hinged at its forward edge 22 to the center pillar 18 and is latched at its rearward edge, not shown, to a suitable rear lock pillar structure, not shown.

The center pillar 18 is part of a rocker panel and center pillar arrangement according to this invention, which will now be described with reference to FIGURES 2 and 3 of the drawings.

The vehicle floor pan 23 is reinforced inwardly of the side edges thereof by channel shaped longitudinally extending reinforcing members 24 provided with flanges 26 which are welded to the floor pan. The edge portions 28 of the floor pan are offset and are welded to offset flanges 30 of longitudinally extending reinforcing members 32 and to lateral flanges 34 of longitudinally extending channel shaped reinforcing members 36. Members 32 and 36 provide box section type structural members which extend longitudinally of the body and reinforce the side edge portions of the floor pan and also provide a connecting means between the rocker panel and pillar arrangement and the floor pan. The outer wall 38 of member 36 includes an intermediate flange portion 40, welded to a flange 42 of member 32, and a terminal laterally extending flange 44. An angle member 46 has one leg thereof secured to the offset lower wall or base 48 of member 36 and the other leg thereof extending laterally to the member 36 to provide a lateral flange 50 which extends oppositely to the flange 44. The members 32 and 36 are further interconnected by spaced bulkheads 52 having flanged edge portions 54 secured to the member 36 and a flanged edge portion 56 secured to the member 32.

The lower portions of the pillar inner members 58 and wings or flanges 59 thereof overlie the walls 38 of member 36, as shown, and are welded to the flanges 44 and 50. Thus, the pillar inner member provides a rocker inner panel member opposite the wall 38.

The rocketr outer panel member 60 is generally of C-shaped cross section and includes terminal lateral flanges 62 and 64 which are secured to the pillar inner member 58 and the flanges or legs 59 thereof generally opposite the flanges 44 and 50. Pillar outer members 63 and 65 include respective inner lateral flanges 66 and 68 which are secured to the pillar inner member 58 and conform to the side edge portions of this member. The flanges 66 and 68 terminate immediately above the flange 64 of the rocker outer panel member. The pillar outer member 63 further includes a flange portion 70 welded to the pillar member 65 and terminates in a lateral flange 72 providing a finger guard flange between the doors 12 and 20 in the closed position thereof, as shown in FIGURE 1. In certain body structures, the doors 12 and 20 fit flush with each other and in such a construction, the flange 72 is dispensed with and the flanged portion 70 is cut back so as to terminate at the outer edge of the pillar outer member 65. Member 63 further includes an offset lateral flange 74 secured to the upper wall 76 of the rocker outer panel 60 and a lateral flange 78 secured to a flange portion 80 of the rocker outer panel member. The pillar member 65 includes a flange 82 similar to flange 74 and secured to wall 76 and a flange 84 which forms a continuation of flange 78 and is secured to the flange portion 80. The pillar outer member 63 provides the lock pillar for the front door 12 and the pillar outer member 64 provides the hinge pillar for the rear door 20.

A pair of bulkheads 86 and 87 fit within the rocker outer panel member 60 and include flanged edges 88 secured to the wall 76 opposite flanges 74 and 82, flanged edges 90 secured to the pillar inner member 58 and flanges 92 secured to the lower wall 94 of the rocker outer panel members.

Generally, the bulkheads 86 are in alignment laterally of the body with the bulkheads 52 of the box section reinforcing members, previously described.

Figure 2:
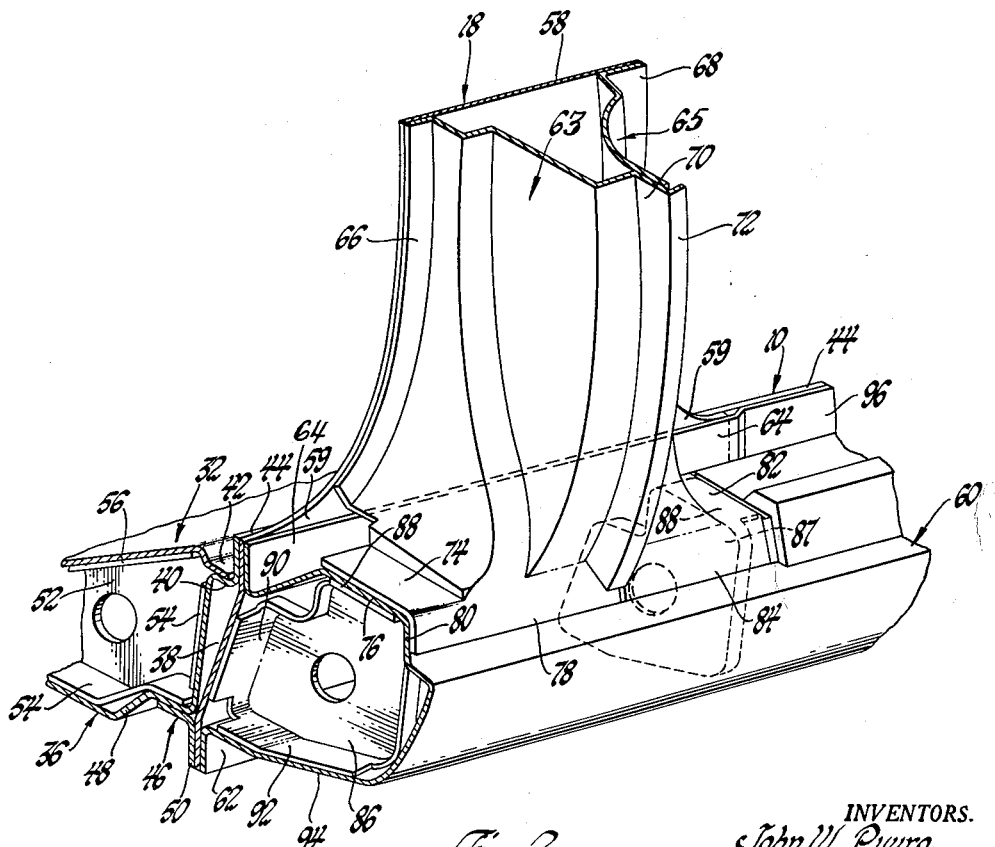
FIGURE 2 is a perspective view of a portion of the rocker panel and pillar arrangement; and, FIGURE 3 is an enlarged sectional view taken generally along the plane indicated by line 3—3 of FIGURE 1.

The legs 59 of the pillar inner member 58 terminate beyond the pillar outer members 63 and 65 and, as shown in FIGURE 2, the flanges 64 of the rocker outer panel members 60 are offset inwardly at 96 immediately adjacent the termination of these legs so as to be directly secured to the flanges 44. Forwardly of the pillar member 63, the flange 64 is offset in the same manner as shown in FIGURE 2, so as to be directly secured to the flange 44, although this is not shown in the drawings.

Thus, this invention provides a new and improved rocker panel and pillar arrangement for integral vehicle bodies.

What is claimed is:

1. A vehicle underbody comprising, in combination, a floor pan, a first box section reinforcing structure secured to an edge portion of said floor pan and including a first pair of oppositely extending flanges, a rocker outer panel member having a second pair of oppositely extending flanges which have longitudinally spaced portions secured to said first oppositely extending flanges, and intermediate portions spaced from said first oppositely extending flanges, a pillar inner member having a lower portion thereof sandwiched between and secured to said first pair of oppositely extending flanges and said intermediate portions of said second pair of oppositely extending flanges to provide a rocker inner panel member which forms a second box section reinforcing structure with said rocker outer panel member, and a pillar outer structure secured to said pillar inner member and to said rocker outer panel member, and supported by said first and second box section structures.

2. A vehicle underbody as described in claim 1 wherein said lower portion of said pillar inner member includes outwardly extending legs.

References Cited in the file of this patent

UNITED STATES PATENTS

| | | |
|---|---|---|
| 2,268,291 | Ledwinka et al. | Dec. 30, 1941 |
| 2,482,906 | Goodwin et al. | Sept. 27, 1949 |
| 2,864,647 | Chesna et al. | Dec. 16, 1958 |